April 15, 1941.  A. R. DE TARTAS  2,238,719

FILM MAGAZINE

Filed Oct. 5, 1938  3 Sheets-Sheet 1

INVENTOR.
AUGUSTUS R. DE TARTAS.
BY Lockwood Goldsmith & Galt
ATTORNEYS.

April 15, 1941. A. R. DE TARTAS 2,238,719
FILM MAGAZINE
Filed Oct. 5, 1938 3 Sheets-Sheet 2

INVENTOR.
AUGUSTUS R. DE TARTAS.
BY Lockwood Goldsmith & Galt
ATTORNEYS.

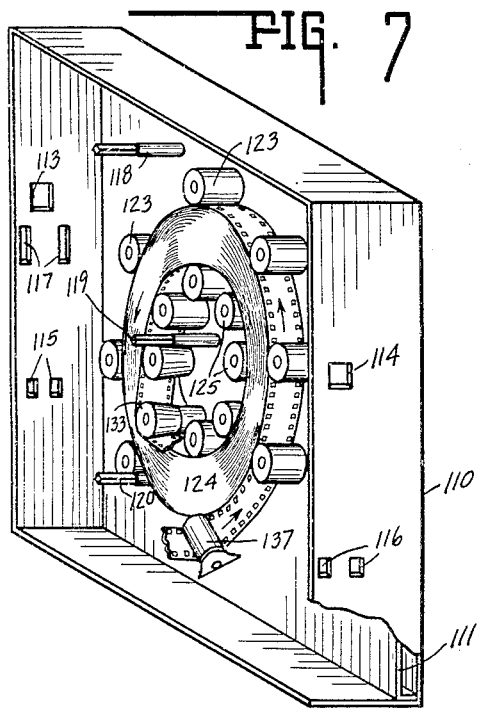
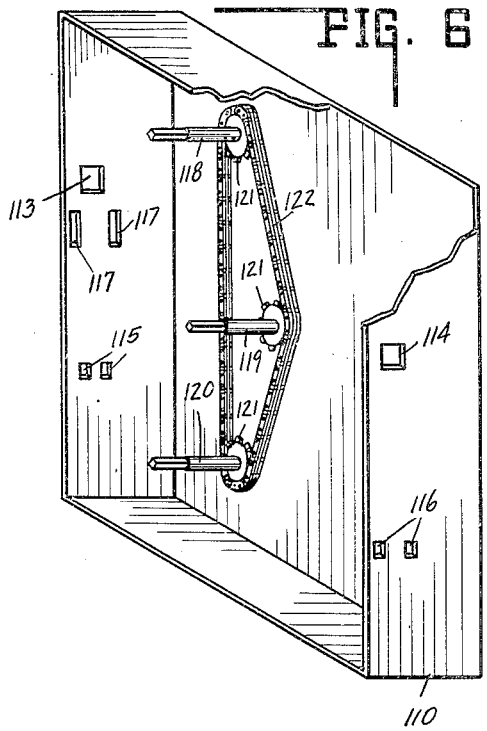
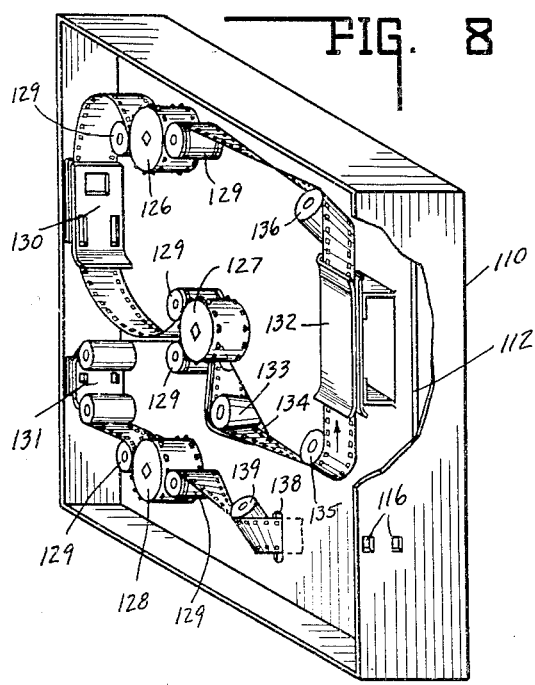

Patented Apr. 15, 1941

2,238,719

UNITED STATES PATENT OFFICE 2,238,719

FILM MAGAZINE

Augustus R. de Tartas, Buffalo, N. Y., assignor to The Rudolph Wurlitzer Company, Cincinnati, Ohio, a corporation Application October 5, 1938, Serial No. 233,373

5 Claims. (Cl. 88—16.2)

This invention relates to a magazine for films which is particularly adapted for use with a motion picture projector having the usual sound reproduction apparatus but which is equally applicable for use with a projector of the silent type or a reproducer for sound alone.

One object of the invention is to provide a magazine which is readily placed in position with relation to the projector by hand or may be manipulated automatically after the manner of phonograph records in the well known automatic phonographs.

Another object of the invention is to provide means in the magazine itself for moving the film for reproduction so that no threading operation is necessary when the magazine has once been placed in proper position with relation to the projector.

Another object of the invention is to provide a magazine having rewinding means operable during the showing of the film so that said film is immedately ready for a second showing upon completion of the first.

Figure 1:
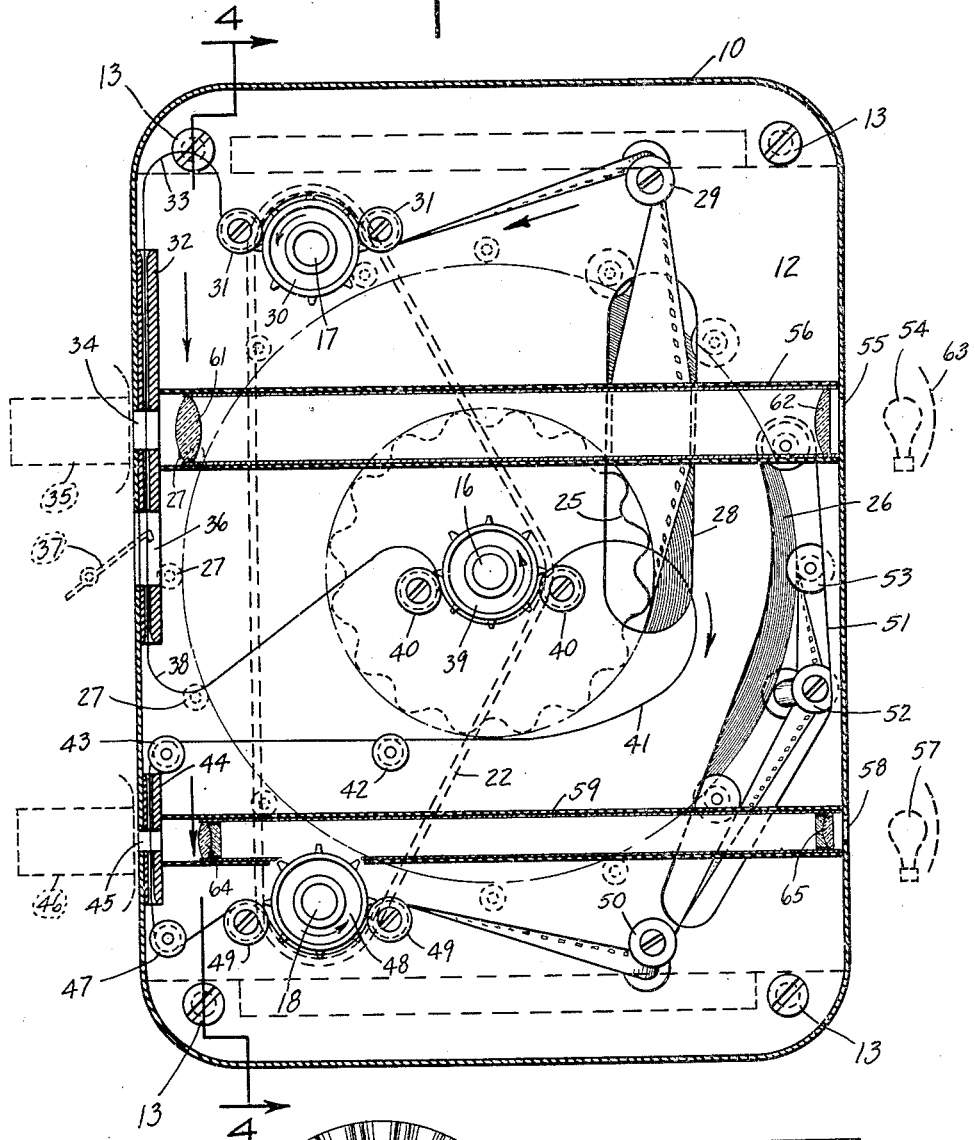
Figure 5:
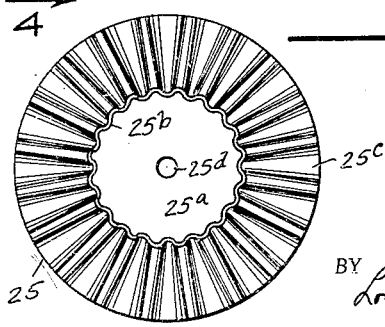
Figure 4:
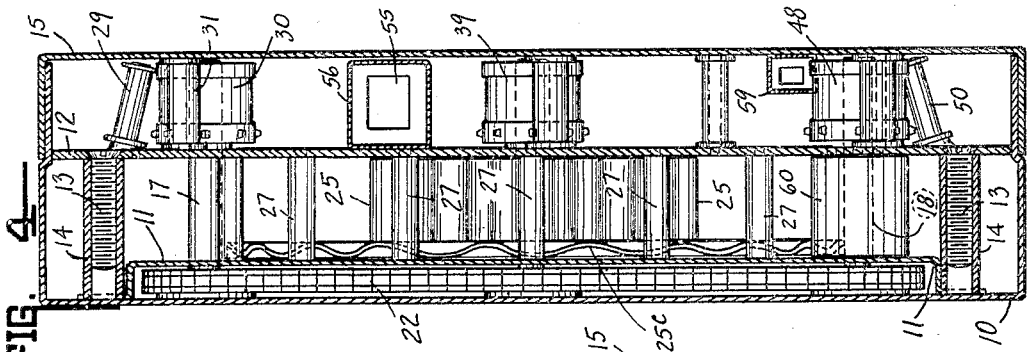
Figure 3:
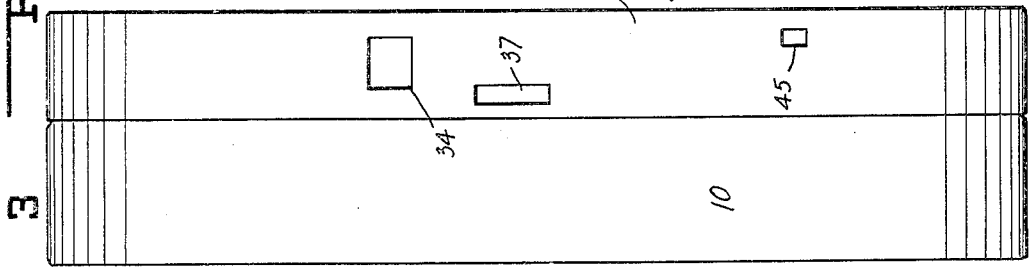
Figure 2:
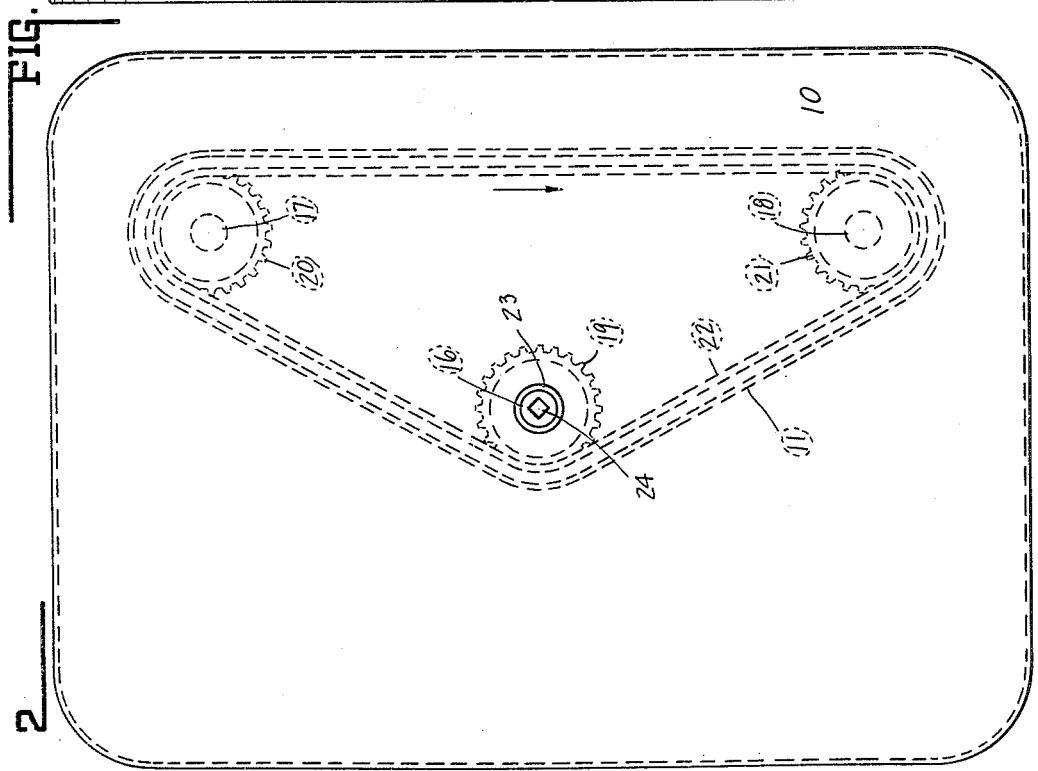

Other objects and features of the invention will be understood from the accompanying drawings and the following description and claims:

Fig. 1 is an elevational view of the film magazine in its preferred form, with its cover plate removed and parts shown in section. Fig. 2 is an elevational view of the other side of the magazine. Fig. 3 is an elevational view of one edge thereof. Fig. 4 is a sectional view taken substantially on the line 4—4 of Fig. 1. Fig. 5 is an elevational view on a reduced scale of a film receiver for use with the magazine. Figs. 6, 7 and 8 are perspective views of an alternative form of the invention. In Fig. 8 the magazine is shown with the cover removed. In Figs. 5, 6 and 7 other parts have been removed to show the remaining parts in detail.

The magazine in the preferred form shown in the drawings, includes a casing 10 in which the entire mechanism is contained. Within the casing, there are provided a pair of assembly plates 11 and 12 dividing the same into a plurality of chambers. The plate 11 is secured to the side wall of the casing 10 and the plate 12 is removably secured by means of screws 13 threadedly engaging spacers 14 secured to plate 11. A cover 15 closes the open side of the casing 10. A central shaft 16 is journaled in suitable bearings on the casing 10 and on plate 12 and similar shafts 17 and 18 are similarly journaled. Within the chamber formed by the casing 10 and plate 11, said shafts have removably secured thereto sprockets 19, 20 and 21, respectively. A sprocket chain 22 is trained about said sprockets as best seen in Fig. 2. The shaft 16 is accessible through an opening 23 in the side wall of casing 10 and is provided with a rectangular recess 24 which may be engaged by a suitable driving member operated by the projector mechanism in timed relation therewith. Thus shaft 16 may be rotated and may drive shafts 17 and 18 through the sprockets and chain just mentioned.

Within the chamber formed between plates 11 and 12 there is provided a film receiver 25 shown in detail in Fig. 5. Said receiver consists of a circular plate 25a and a generally cylindrical boss 25b on which the film may be wound. The plate 25a extends beyond the boss 25b to form a flange 25c which is corrugated as best seen in Fig. 4. The cylindrical boss 25b is likewise corrugated as seen in Fig. 5. The plate 25a is provided with a central opening 25d freely fitting the central shaft 16. A roll of film 26 (Fig. 1) is wound about the boss 25b and its outer periphery is engaged by a plurality of rollers 27.

The plate 12 is provided with an opening 28 through which the film may be led from the inner edge of the roll 26 to a guide roller 29 mounted on the plate 12. Said guide roller, as best seen in Fig. 4, is positioned in the space between plate 12 and the cover 15 and is arranged at a suitable angle to guide the film from the inner chamber. From the roller 29 the film is led about a film sprocket 30 secured to the shaft 17 and is retained in contact with said sprocket by a pair of guide rollers 31.

From the roller 31 the film is passed through a raceway formed by guide members 32, a loop 33 being formed therein between said roller and said raceway. The members 32 guide the film past an aperture 34 which may be positioned, when the magazine is in use, adjacent the housing 35 of the projector which contains the usual projector lens. Said members also guide the film past a second aperture 36 which, when the magazine is in use, is positioned adjacent the finger 37 or other member of the projecting mechanism which imparts the necessary intermittent motion to the film for proper framing of the images. Upon leaving the raceway 32, a second loop 38 is formed in the film and it then passes over a film sprocket 39 secured to the central shaft 16 and is held in engagement with said sprocket by guide rollers 40. A third loop 41 is then formed in said film and it then passes over guide rollers 42 and 43 to a second raceway formed by guides 44 which guide the same past an aperture 45 positioned adjacent the photocell housing 46 of the projector mechanism. From the guide members 44, the film is led over a roller 47 and thence over a film sprocket 48 secured to the shaft 18 and is held in engagement with said sprocket by guide rollers 49. The film then passes over a guide roller 50 mounted upon the plate 12 and arranged at an angle as shown in Fig. 1. From the roller 50 the film passes rearwardly through an opening 51 in the plate 12 and is guided into position on the outer edge of the roll 26 by rollers 52 and 53.

In threading the film as just described, the film sprockets 30, 39 and 48 are detached from their shafts, the plate 12 is removed, and the film receiver 25 with the film wound thereon is placed in position over the central shaft. The plate 12 is then replaced and the inner and outer ends of the film are drawn through the openings 28 and 51 respectively. One of said ends is threaded about the several sprockets and guide rollers and the two ends are then joined in any sutable manner. The film is then in the form of a continuous ribbon which may be progressively unwound from the center of the roll 26 as the sprockets 30, 39 and 48 are rotated and which is continuously rewound on the outer edge of the roll. By this means, it will be apparent that when the film has been completely shown, the starting point thereon has again reached the inner edge of the reel and is immediately ready for reshowing. In the winding and unwinding of the film the receiver 25 rotates freely on the shaft 16. The corrugations of the boss 25b assist the removal of the film from the inner edge of the roll since they provide actual contact between the film and receiver only at spaced intervals. In the progress of the film from the outer to the inner edge of the roll there is a differential slippage of each layer on adjacent layers and consequently there is relative movement of the outer parts of the film with respect to the flange 25c. The corrugations on said flange serve to reduce the area in frictional contact and thus to reduce frictional strain on the film.

When the magazine is in position with respect to the projector, the projector lamp 54 thereof is in the position shown in Fig. 1 and may project its light through apertures 55 in the rear edges of the casing 10 and cover 15 and from thence through a passageway formed by a rectangular tube 56 to the aperture 34. Suitable lenses 61 and 62 or a reflector 63, or both, may be used to prevent undesired dispersion of the light in passing through said passageway or said passageway may contain a bar of fused quartz or the material commercially known as Lucite, adapted to transmit light in a straight line without appreciable dispersion. The light passing through the channel reaches the projector lens through the film image momentarily framed in the aperture 34 and thus may serve to project the image on the usual screen.

Similarly, the light from the exciter lamp 57 of the projector is passed through apertures 58 in the rear edge of the casing 10 and cover 15 and is transmitted through an optical system contained in a channel 59 to the aperture 45. The last mentioned aperture is properly positioned with respect to the sound track on the film to transmit said light in varying frequencies to the photocell system of the projector which translates the same into varying electric current to be again translated into sound by the amplification system of the projector in the usual manner. The optical system within the channel 59 preferably consists of lenses 64 and 65 adapted to focus the beam from lamp 57 on the sound track of the film in the form of a fine light line image best adapted for scanning the sound track. In order to provide as smooth a movement of the film as possible past the sound aperture 45, a heavy metallic cylinder 60 is secured to the shaft 18 between plates 11 and 12 and serves as a flywheel.

In the alternative form of the invention shown in Figs. 6, 7 and 8 there is provided a casing 110 similar to the casing 10 and which may be divided in a similar manner by assembly plates 111 and 112. In Fig. 6 the magazine is shown with both assembly plates and associated members removed. In Fig. 7 assembly plate 112 and associated members have been removed. The casing is provided with apertures 113 and 114 for the picture and optical system, apertures 115 and 116 for the sound system and an aperture 117 for the intermittent film moving fingers or sprocket.

Sprocket shafts 118, 119 and 120 are journaled on the rear wall of the casing and on the assembly plate 111 and carry sprockets 121 about which there is trained a sprocket chain 122. Said sprockets and chains rest in the compartment between the assembly plate 111 and the rear wall of the casing.

Mounted on the assembly plate 111 there are provided a plurality of rollers 123 engaging and guiding the outer edge of a roll 124 of film. A similar set of rollers 125 engages and guides the inner edge of the roll.

The shafts 118, 119 and 120 project through the assembly plate 111 and have secured thereto film moving sprockets 126, 127 and 128. Guide rollers 129 are mounted on the assembly plate 112 and serve to hold the film in engagement with said sprockets. A picture raceway 130 and a sound raceway 131 are also mounted on the plate 112. There is provided a raceway 132 likewise mounted on the plate 112 and spaced therefrom to permit passage of the light between the apertures 113 and 114.

In the use of this form of the magazine, the sprockets 126, 127 and 128 are first removed and the assembly plate 112 and associated parts are lifted out. The roll of film is then placed in position on the plate 111 between the outer and inner sets of rollers 123 and 125. A length of film is drawn from both the inner and outer edges of the roll, the inner end being threaded through an opening 134 in plate 112 and the outer end through an opening 138 therein. The plate 112 is then replaced in the casing and the sprockets 126, 127 and 128 are replaced on their shafts.

The inner end of the film is led about a tapered roller 133 which guides the same through opening 134. From said roller the film is led over an inclined roller 135 mounted on the plate 112 and thence through the raceway 132. From said raceway the film is led over an inclined roller 136, about the sprocket 126, through the raceway 130, about the sprocket 127, through the raceway 131, and over the sprocket 128. The outer end of the roll is led about an inclined roller 137, through the opening 138, and about the roller 139. The two ends are then joined by suitable means to form an endless film. The cover may then be replaced and the magazine is ready for use.

From the foregoing description it will be apparent that the invention provides a completely self-contained magazine unit which may be placed in proper position with respect to a projector with no more manipulation than that required in placing a record on a phonograph. It may be manually manipulated, or a number of them may be placed in a suitable storage container and automatically presented to the projector by automatic mechanism either in a predetermined sequence or selectively, as may be desired.

No awkward threading operation is required once the magazine has been loaded, no matter how many times the film is shown. No time-consuming rewinding operation is required since the film is instantly available for a second showing upon completion of the first.

The invention has been described in its present preferred form. The details however may be varied within wide limits without departing from the scope thereof as defined by the appended claims.

It is evident that the invention is applicable to the simultaneous reproduction of sound and picture records or the reproduction of either sound or pictures alone. The reference in the claims to the reproduction of "sensible impressions" is intended to include either or both.

The invention claimed is:

1. A film magazine for use with a projector actuated by a beam of light, including a casing, a partition therein dividing said casing into two major compartments, means in one of said compartments for storing a roll of film having a photographic record thereon, means forming a passageway for said light beam through the second compartment, and drive sprockets in said second compartment adapted to engage said film and to draw the same from one edge of the roll, through an opening in said partition to the second compartment, across said passageway to intercept said beam of light and thence back through an opening in said partition to the other edge of said roll.

2. A film magazine for use with a projector actuated by a beam of light, including a casing, a partition therein dividing said casing into two major compartments, means in one of said compartments for storing a roll of film having a photographic record thereon, means forming a passageway for said light beam through the second compartment, drive sprockets in said second compartment adapted to engage said film and to draw the same from one edge of the roll, through an opening in said partition to the second compartment, across said passageway to intercept said beam of light and thence back through an opening in said partition to the other edge of said roll, and means for simultaneously rotating said drive sprockets from a common power source external of said magazine.

3. A self-contained film magazine unit for use with a device having a light source and reproduction apparatus actuated by a beam of light from said source for reproduction of sensible impressions from a photographic film record, said magazine unit including means forming a passageway for said light beam through said magazine, an optical system carried within said magazine and adapted to direct said beam through said passageway, means for storing an endless film record in said magazine, guide members adapted to guide said film across said passageway to intercept said beam, sprocket means engaging said film and adapted to run the same continuously from said storage means to said guide members and back to said storage means, and mechanism arranged to detachably connect said sprocket means to an external source of driving power.

4. A film magazine for use with a device having a light source and reproduction apparatus actuated by a beam of light from said source for reproducing sensible impressions from a photographic film record, said magazine including a casing having apertures for the passage of said beam therethrough, an optical system carried within said casing and adapted to direct said beam between said apertures, means for storing in said casing an endless film having a photographic record thereon, guide members adapted to guide said film between said apertures to intercept said light beam, sprocket means engaging said film and adapted to run the same continuously from said storage means to said guide members and back to said storage means, and mechanism arranged to detachably connect said sprocket means to an external source of driving power.

5. A self-contained film magazine unit for use with a device having a light source and reproduction apparatus actuated by a beam of light from said source for reproduction of sensible impressions from a photographic film record, said magazine unit including means for storing an endless roll of film in said magazine, means forming a passageway for said light beam through said magazine, said passageway lying in a plane substantially parallel to and at one side of said film roll, driving means adapted to unwind a loop of film from said roll and rewind the same thereon, and guide members adapted to guide said loop from said roll, twist the same from the plane of said roll to the plane of said passageway, guide the same across said passageway to intercept said beam and return the same to the plane of said roll for rewinding thereon.

AUGUSTUS R. de TARTAS.